(12) United States Patent
Van Den Bossche et al.

(10) Patent No.: US 6,625,982 B2
(45) Date of Patent: Sep. 30, 2003

(54) ELECTRONICALLY CONTROLLED HYDRAULIC ACTUATING SYSTEM

(75) Inventors: Dominique Alain Van Den Bossche, Mones (FR); Jean-Marc François Michel Ortega, Blagnac (FR); Christophe Lionel René Casse, Toulouse (FR)

(73) Assignee: Airbus France, Toulouse (FR)

( * ) Notice: Subject to any disclaimer, the term of this patent is extended or adjusted under 35 U.S.C. 154(b) by 10 days.

(21) Appl. No.: 10/069,408

(22) PCT Filed: Jun. 28, 2001

(86) PCT No.: PCT/FR01/02048
§ 371 (c)(1),
(2), (4) Date: Feb. 26, 2002

(87) PCT Pub. No.: WO02/01080
PCT Pub. Date: Jan. 3, 2002

(65) Prior Publication Data
US 2002/0121087 A1 Sep. 5, 2002

(30) Foreign Application Priority Data
Jun. 28, 2000 (FR) .............................. 00 08304

(51) Int. Cl.$^7$ .......................... F15B 20/00; B64C 13/42
(52) U.S. Cl. ............................. 60/403; 60/476; 244/78; 244/226
(58) Field of Search ....................... 60/403, 405, 486, 60/476; 244/75 R, 78, 226, 227

(56) References Cited

U.S. PATENT DOCUMENTS 2,643,516 A    6/1953   Carlson
5,074,495 A  * 12/1991  Raymond .................... 60/403
5,181,380 A  *  1/1993  Favre et al. .................. 60/405

FOREIGN PATENT DOCUMENTS

| DE | 19654781 | 7/1998 |
|---|---|---|
| FR | 2600724 | 12/1987 |
| FR | 2666787 | 3/1992 |

OTHER PUBLICATIONS

Croke, et al. "More Electric Initiative—Power–By–Wire Actuation Alternatives" Proceedings of the National Aerospace and Electronics Conference. (NAECON, US, New York, IEEE, pp. 1338–1346, May 23, 1994.*

* cited by examiner

Primary Examiner—Edward K. Look
Assistant Examiner—Thomas E. Lazo
(74) Attorney, Agent, or Firm—Stevens, Davis, Miller & Mosher, LLP

(57) ABSTRACT

An electrically controlled hydraulic actuating system includes a servocontrol including a cylinder, a piston dividing the cylinder into two chambers each provided with a hydraulic connection port, a control valve connected to a hydraulic circuit. A two-way hydraulic pump is driven in rotation by an electric motor driven by power electronics. A switching device allows the connection ports of the chambers to be connected either to the control valve or the pump. The switching device connects the hydraulic connection ports both to the control valve and the pump, so as to allow the servocontrol to be supplied the sum of the hydraulic power delivered by the hydraulic circuit and the hydraulic power generated by the pump actuated by the electric motor.

4 Claims, 5 Drawing Sheets

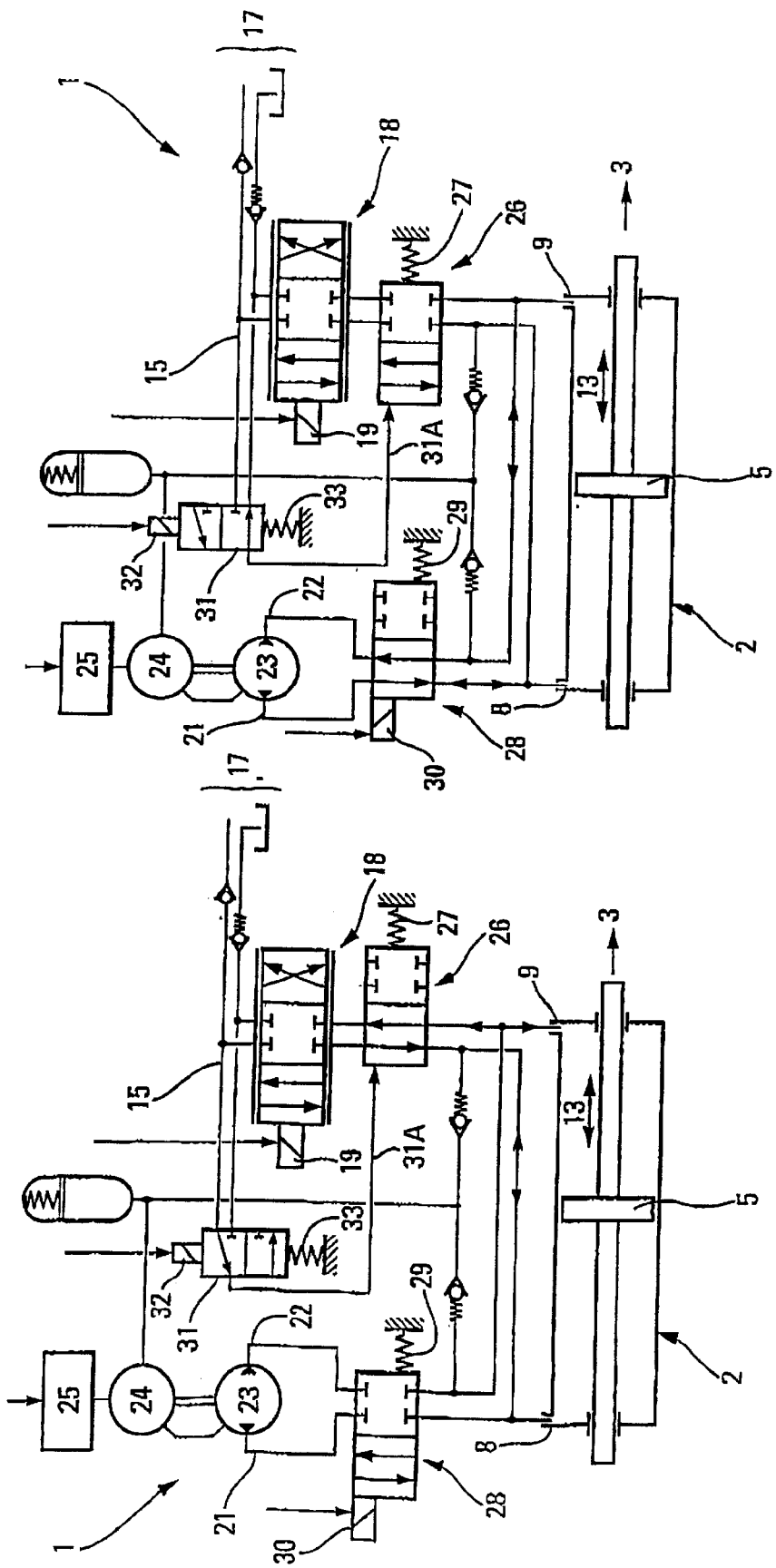

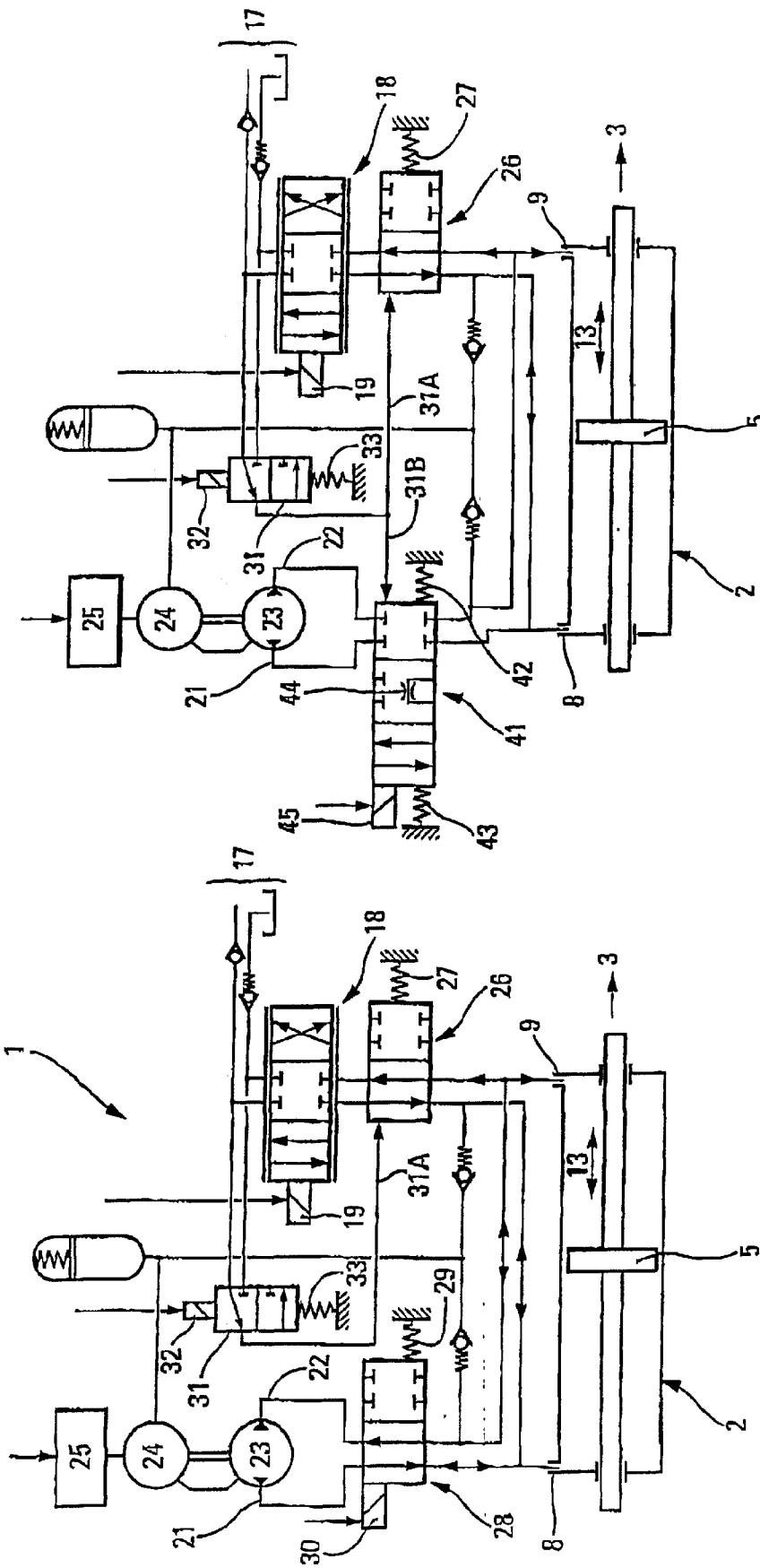

ELECTRONICALLY CONTROLLED HYDRAULIC ACTUATING SYSTEM

Figure 1:
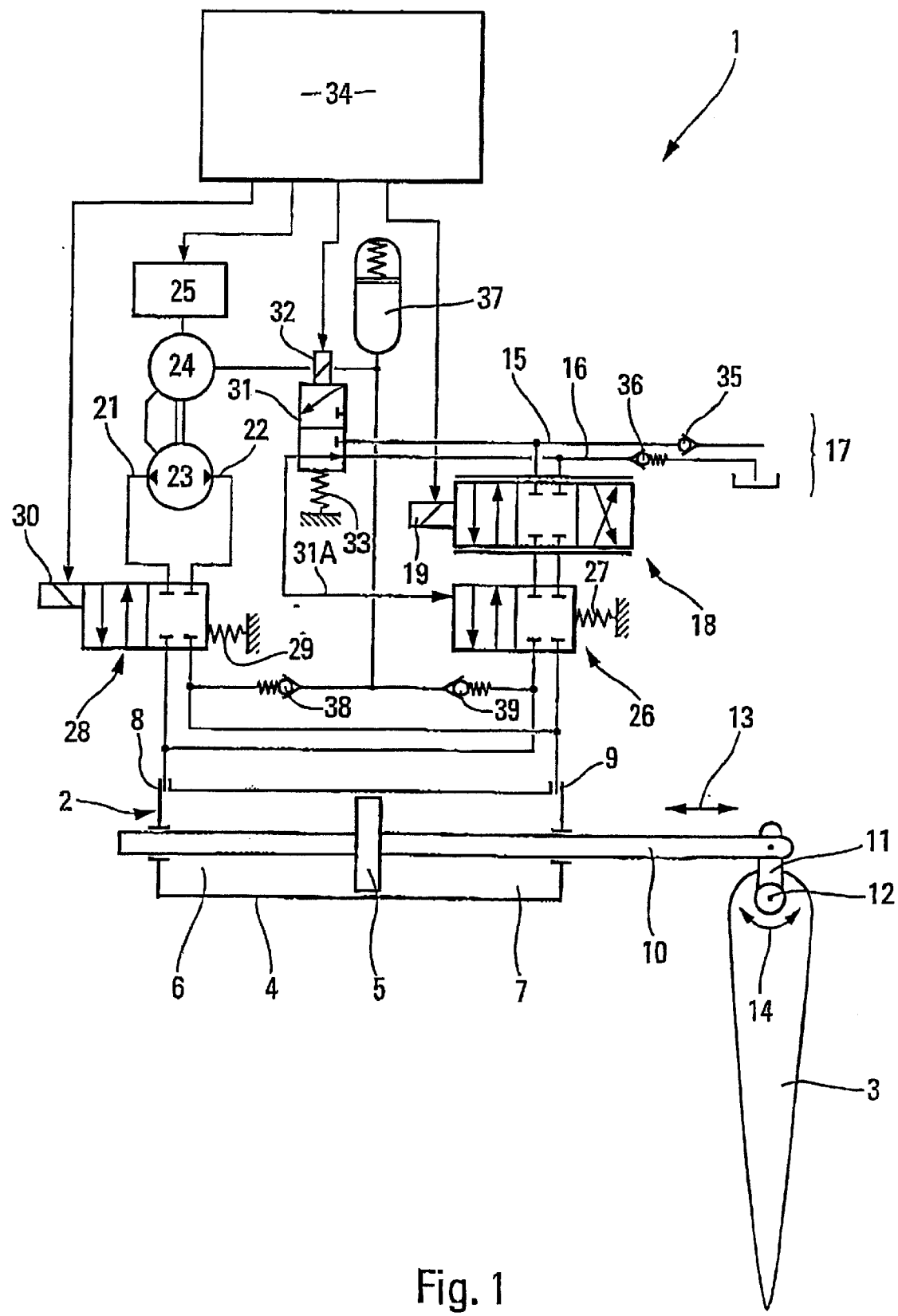

The present invention relates to an electrically controlled hydraulic actuating system. Although not exclusively, it is particularly suited to use on board aircraft, for controlling parts such as control surfaces for example.

Electrically controlled hydraulic actuating systems comprising:

- a servocontrol, intended to control at least one moving part, such as a control surface, and comprising a cylinder inside which a piston to which said moving part is connected can move, said piston dividing said cylinder into two chambers, each of which is provided with a hydraulic connection port, and said servocontrol being provided with a control valve, for example of the servovalve or directly controlled valve type, connected to a hydraulic circuit in which a hydraulic fluid under pressure circulates;
- a two-way hydraulic pump, driven in rotation by an electric motor driven by power electronics; and
- a switching device allowing said hydraulic connection ports to be connected either to said control valve or to said pump, are already known.

In these known systems, actuation of said moving part is, in normal operation, performed by said servocontrol supplied with hydraulic fluid by said circuit through said valve and said switching device. By contrast, in the event of failure of said hydraulic circuit or of said valve, the switching device connects said servocontrol to said hydraulic pump. Actuation of said moving part is then, under exceptional operating circumstances, the result of the servocontrol being powered by said pump driven by the electric motor, through the switching device.

As a result, these systems are generally known by the abbreviation EBHA which stands for electrical back-up hydraulic actuator.

Of course, both in normal operation (where the actuating system is being supplied from the hydraulic circuit) and in back-up operation (when the actuating system is being supplied from the pump and the electric motor), such known systems need to be able to provide the maximum performance needed to actuate said part. The result of this is therefore that, on the one hand, the hydraulic circuit needs to be designed for the maximum power of the actuating system and that, on the other hand, although used infrequently, said pump and its accessories need to be robustly engineered, which increases their cost and mass. Furthermore, for the very reason that they are little used, they may be the site of breakdowns that are difficult to detect.

The purpose of the present invention is to overcome these drawbacks. The invention relates to an electrically controlled hydraulic actuating system of the type recalled hereinabove in which the design not only of the pump and its accessories but also of the hydraulic circuit, the valve and their accessories can be scaled down, while at the same time making any breakdowns of the pump and of its accessories more visible.

To this end, according to the invention, the electrically controlled hydraulic actuating system, of the type mentioned hereinabove, is noteworthy in that said switching device is additionally able to connect said hydraulic connection ports of said chambers both to said control valve and to said pump, so as to allow said servocontrol to be supplied the sum of the hydraulic power delivered by said hydraulic circuit and of the hydraulic power, of electrical origin, generated by said pump actuated by said electric motor.

Such a system can therefore be termed electrically assisted hydraulic actuator, abbreviated to EAHA.

Thus, by virtue of the present invention, it is possible to provide maximum required performance by summing the hydraulic power and the electrical power available, the electrical power being used only during heavy demands for power likely to exceed the hydraulic capability. In other words, the hydraulic circuit and the control valve (which deliver the hydraulic power) are engineered to be able to perform most actuations, which require a power lower than that demanded for maximum performance. By contrast, the hydraulic pump and its accessories (which deliver power of electrical origin) are engineered to supply top-up power which, when added to said hydraulic power, allows said maximum performance to be provided. The result of this is that each element of the system according to the invention can be engineered according to the actual power (lower than the maximum power of said system) that it has to provide. In addition, because the "electrical" elements of the system, that is to say the motor, the pump and their air accessories, are called upon during operation of said system, their breakdowns cannot remain hidden.

In the system according to the present invention, said switching device may consist of a first and a second selectors with specific controls, it being possible for said first selector to be inserted between said valve and said connection ports, while the second selector may be arranged between the latter and said pump, and the specific controls of said first and second selectors allowing said hydraulic connection ports to be connected not only to said control valve or to said pump, but also to both said control valve and said pump.

As a preference, said first selector:

- can adopt either a passing state or a non-passing state;
- spontaneously adopts its non-passing state; and
- is forced into its passing state by the action of the pressure of the hydraulic fluid of said hydraulic circuit, through a controlled electric valve.

Furthermore, according to a first embodiment, said second selector:

- can adopt either a passing state or a non-passing state;
- spontaneously adopts its non-passing state; and
- is forced into its passing state by the action of a control device.

As an alternative, said second selector:

- can adopt any one of three states, namely a passing state, a non-passing state or a passive state for which said second selector establishes external communication with restriction between said hydraulic connection ports;
- spontaneously adopts said passive state;
- is forced into its passing state by the action of a control device; and
- is forced into its non-passing state by the action of the pressure of the hydraulic fluid of said hydraulic circuit, through said controlled electric valve.

The figures of the appended drawing will make it easy to understand how the invention may be achieved. In these figures, identical references denote similar elements.

FIG. 1 schematically illustrates a hydraulic actuating system according to the present invention.

FIGS. 2, 3 and 4 respectively illustrate three modes of operation of the system of FIG. 1.

Figure 5:
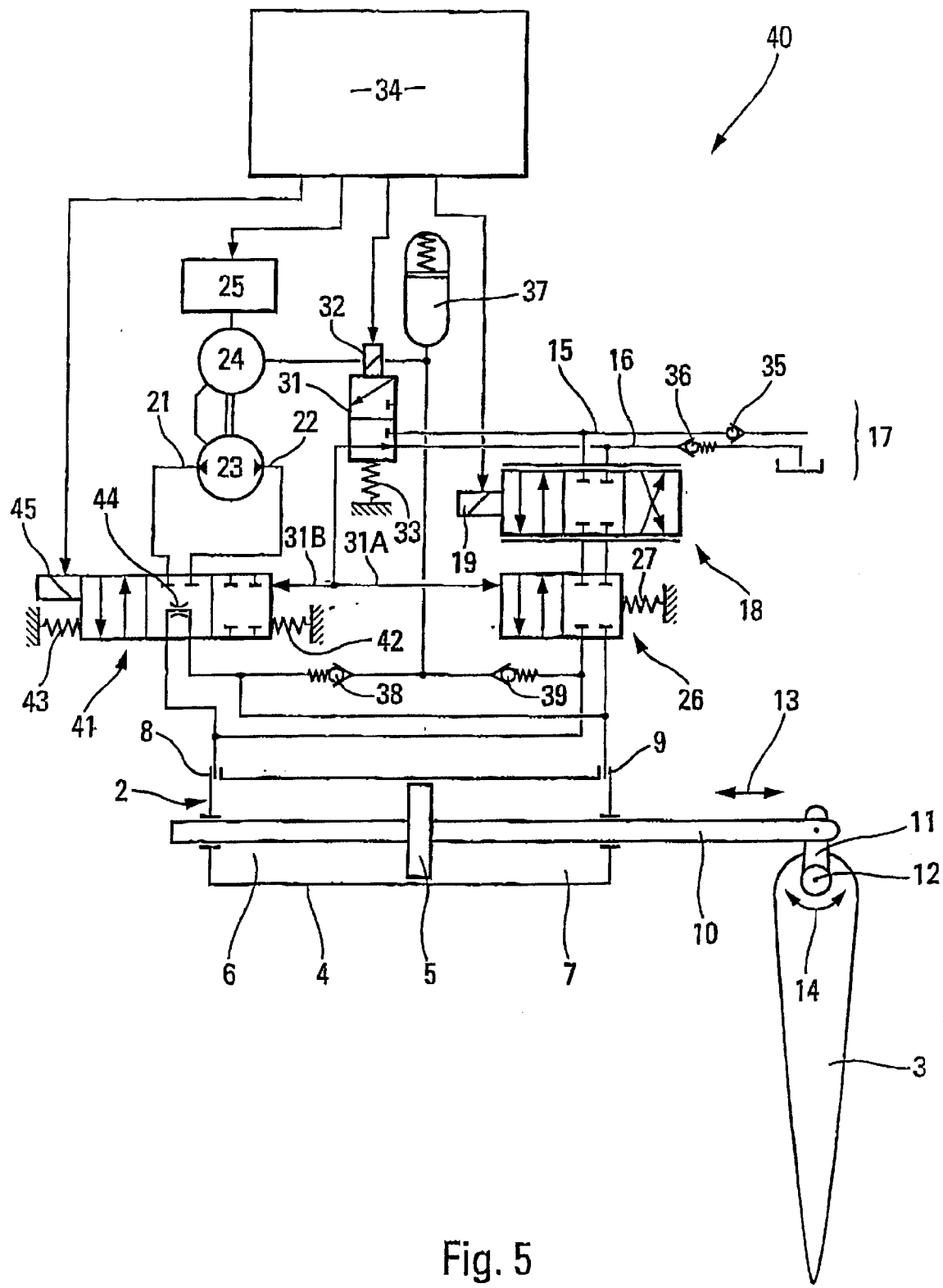

FIG. 5 schematically illustrates an alternative form of embodiment of the hydraulic actuating system according to the present invention, in a passive mode of operation.

Figure 8:
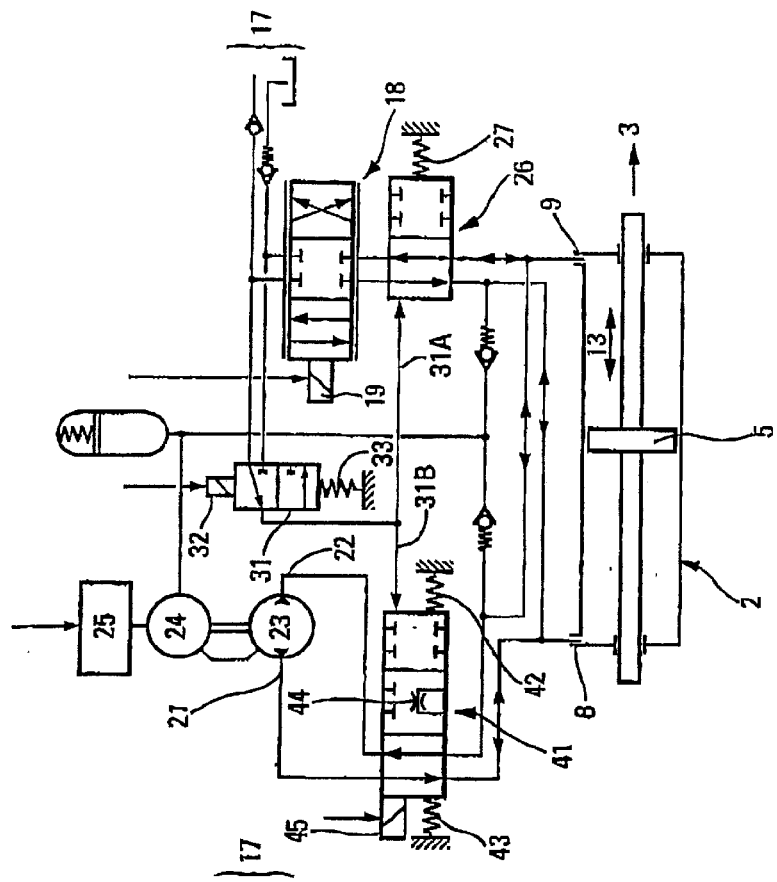
Figure 7:
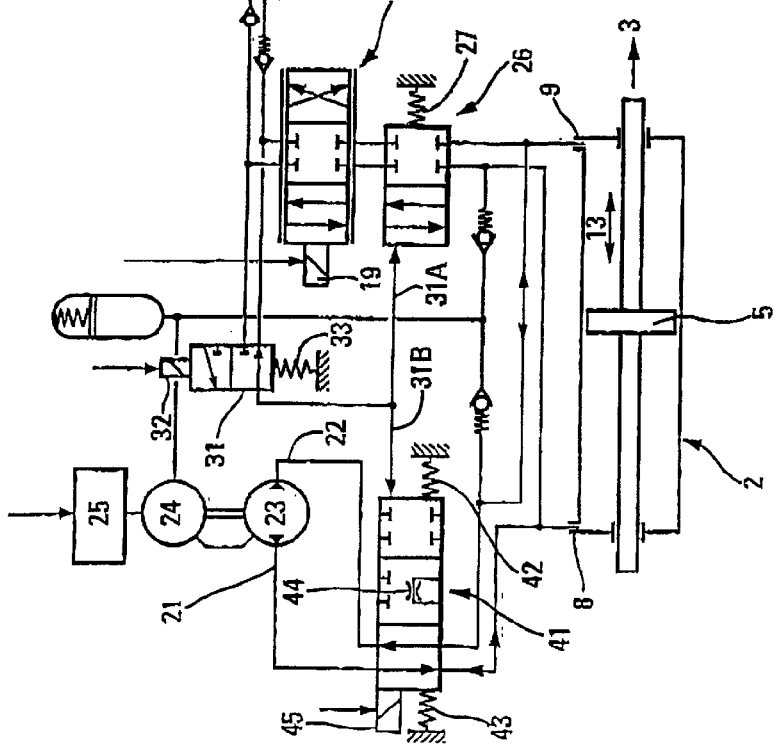

FIGS. 6, 7 and 8 illustrate the system of FIG. 5 in three other modes of operation.

The electrically controlled hydraulic actuating system 1 shown in FIG. 1 and according to the present invention comprises a servocontrol 2 intended to control at least one moving part 3, for example an aircraft control surface. The servocontrol 2 comprises a cylinder 4 inside which a piston 5 which divides said cylinder 4 into two chambers 6 and 7 can move. The chambers 6 and 7 are each provided with a hydraulic connection port 8 and 9, respectively. The piston 5 is secured to a piston rod 10 articulated to a wrist pin 11, secured to said moving part 3 in rotation about an axis 12 (orthogonal to the plane of FIG. 1). It will be readily understood that, when said piston rod 10 moves coaxially to itself in one direction or the other, as indicated by the double-headed arrow 13, the moving part 3 rotates about said axis 12 in the corresponding direction, as indicated by the double-headed arrow 14.

Each of the connection ports 8 and 9 of the servocontrol 2 can be connected either to the supply line 15 or to the return line 16 of a hydraulic circuit 17 in which a hydraulic fluid under pressure circulates, via a control valve 18, for example of the servovalve or directly controlled valve type. The control valve 18 is controlled by a device 19, for example of the solenoid type. Under the action of said control device 19, the valve 18 can adopt:

- a position in which communication between the circuit 17 and the servocontrol 2 is cut (the position depicted in FIG. 1);
- a position in which the connection port 8 is connected to the supply line 15, while the connection port 9 is connected to the return line 16; and
- a position for which the connection port 8 is connected to the return line 16, while the connection port 9 is connected to the supply line 15.

In addition, said connection ports 8 and 9 can be connected respectively to the outlets 21 and 22 of a two-way hydraulic pump 23, driven in rotation by an electric motor 24 driven by power electronics 25.

Between the control valve 18 and the connection ports 8 and 9 is mounted a first selector 26, loaded by a spring 27. Said selector 26, under the action of the spring 27, spontaneously adopts its non-passing position for which communication between the control valve 18 and the servocontrol 2 is interrupted.

Likewise, mounted between the pump 23 and the connection ports 8 and 9 is a second selector 28, loaded by a spring 29. Said selector 28, under the action of the spring 29, spontaneously adopts its non-passing position for which communication between the pump 23 and the servocontrol 2 is interrupted. Furthermore, a control device 30, for example of the solenoid type, is capable of causing the selector 28 to switch into its passing position establishing communication between the pump 23 and the servocontrol 2, against the action of the spring 29.

A two-position electric valve 31, controlled by a control device 32 against the action of the spring 33, is inserted between the hydraulic circuit 17 and the selector 26 and is connected to the latter by a line 31A. When the control device 32, for example a solenoid, is at rest, the spring 33 presses the electric valve 31 into its position for which said selector 26 is connected to the return line 16 of the hydraulic circuit 17. By contrast, when the control device 32 is active, it compresses the spring 33 and the electric valve 31 is in its passing position for which the selector 26 is connected to the supply line 15 of the hydraulic circuit 17. In the latter position, the pressure of the hydraulic fluid in the line 15 overcomes the action of the spring 27 which means that the selector 26 switches into its passing position.

The control devices 19, 30, 32 and the power electronics 25 may be controlled by a device 34, for example a computer.

The hydraulic actuating system 1 is supplemented by isolation valves 35 and 36, mounted respectively on the lines 15 and 16 of the circuit 17, and by a hydraulic accumulator 37 and by resupply valves 38 and 39.

In FIG. 1, the system 1 is depicted in its state of rest, none of the control devices 19, 25, 30 and 32 being activated by the computer 34.

As is illustrated schematically in FIGS. 2, 3 and 4, the system 1 can operate in three different modes.

In the first mode illustrated in FIG. 2, the computer 34 activates the control device 32 of the electric valve 31, but leaves the control device 30 inactive. Under these conditions, the electric valve 31 sends the pressure of the line 15 to the selector 26. The result of this is that said first selector 26 switches into its passing position, said pressure overcoming the action of the spring 27. As a result, the connection ports 8 and 9 of the cylinder 2 are isolated from the pump 23, whereas they may be placed in communication with the hydraulic network 17, through the control valve 18. As the control device 19 of the latter is controlled by the computer 34, the piston 5 and the part 3 are therefore actuated simply from the hydraulic fluid of the network 17.

In the second mode of operation of the system 1, illustrated schematically in FIG. 3, the computer 34 activates the control device 30 of the second selector 28, and the power electronics 25, but leaves the control devices 19 and 32 inactive. As a result, the electric valve 31 and the first selector 26 are in their non-passing position and the control valve 18 is inactive. By contrast, the control device 30 overcomes the action of the spring 29 and the second selector 28 switches into the passing position. As a result, the connection ports 8 and 9 of the cylinder 2 are isolated from the hydraulic circuit 17, but are connected to the two-way pump 23 through the second selector 28. The piston 5 and the part 3 are then therefore actuated from the pump 23, by driving of the electric motor 24 by the power electronics 25, themselves controlled by the computer 34.

As to the third mode of operation of the system 1, illustrated in FIG. 4, this results from joint activation of the control devices 19, 30, 32 and of the power electronics 25 by the computer 34. Under these conditions:

- the electric valve 31 and the first selector 26 are passing, as in the first mode of operation; and
- the second selector 28 is also passing (as in the second mode of operation) because the control device 30 has overcome the action of the spring 29.

As a result, the connection ports 8 and 9 of the cylinder 2 are connected, simultaneously, to the circuit 17, through the control valve 18, and to the pump 23. The piston 5 and the part 3 are therefore actuated jointly from the hydraulic circuit 17 and from the electrically driven pump 23.

The embodiment 40 of the system of the invention, depicted in FIG. 5, is identical to the system 1 in FIGS. 1 to 4, except regarding the second selector. In the case of the system 40, said second selector 41 (replacing the second selector 28) comprises, in addition to the passing and non-passing positions, a passive position for which said second selector 41 establishes external communication with restriction between the hydraulic connection ports 8 and 9 of the cylinder 4. This passive position (depicted in FIG. 5) exists when the first selector 26 is non-passing and is defined by the action of opposing springs 42 and 43. Depending on the level of restriction of the port 44 that makes this communication with restriction, it is possible to obtain a bypassing of the cylinder 2, some degree of damping of the movements of the piston 5 and of the control surface 3, or alternatively still, almost total immobilization of said piston 5.

The passive position of the second selector 41 is in a position that is intermediate between the passing position and the non-passing position. A control device 45 (analogous with the device 30), controlled by the computer 34, is capable of causing said second selector 41 to switch from its passive position into its passing position. In addition, the second selector 41 can switch from its passive position to its non-passing position under the action of the pressure of the hydraulic fluid in the supply line 15, through the controlled electric valve 31 and a link 31B.

As a result, operation of the system 40 is as follows:

- in the first mode, depicted in FIG. 6 and corresponding to FIG. 2, the control device 32 is activated by the computer 34, which leaves the control device 45 unactivated. Under these conditions, the electric valve 31 sends the pressure of the line 15 to the selectors 26 and 41. The result of this is that said first selector 26 adopts the passing position and that said second selector 41 switches into the non-passing position under the action of the pressure of the line 15, aided by the spring 42 and overcoming the action of the spring 43. The control surface 3 is then therefore controlled by the hydraulic circuit 17 through the control valve 18;
- in the second mode, depicted in FIG. 7 and corresponding to FIG. 3, the computer 34 activates the control device 45, and the power electronics 25, the control device 19 and 32 remaining inactive. As a result, the electric valve 31 and the first selector 26 are non-passing and the control valve 18 is inactive. By contrast, the control device 45, aided by the spring 43, overcomes the action of the spring 42. The control surface is therefore controlled by the pump 23, itself driven by the computer 34 and the power electronics 25;
- in the third mode, depicted in FIG. 8 and corresponding to FIG. 4, the control devices 19, 32, 45 and the power electronics 25 are actuated simultaneously by the computer 34. The result of this is therefore that the electric valve 31 and the first selector 26 are passing and the same is true of the second selector 41, whose control device 45, aided by the spring 43, overcomes the action of the spring 42 and of the pressure in the line 31B. As a result, the control surface 3 is actuated jointly by the hydraulic circuit 17 and by the pump 23.

What is claimed is:

1. An electrically controlled hydraulic actuating system comprising:

- a servocontrol, intended to control at least one moving part and comprising a cylinder inside which a piston to which said moving part is connected can move, said piston dividing said cylinder into two chambers, each of which is provided with a hydraulic connection port, and said servocontrol being provided with a control valve connected to a hydraulic circuit in which a hydraulic fluid under pressure circulates;
- a two-way hydraulic pump, driven in rotation by an electric motor driven by power electronics; and
- a switching device allowing said connection ports of the chambers to be connected either to said control valve or to said pump, wherein:
    - said switching device is additionally able to connect said hydraulic connection ports of the chambers both to said control valve and to said pump, so as to allow said servocontrol to be supplied the sum of the hydraulic power delivered by said hydraulic circuit and of the hydraulic power, of electrical origin, generated by said pump actuated by said electric motor, and
    - said switching device comprises a first and of a second selector, with specific controls;
- said first selector is inserted between said control valve and said hydraulic connection ports, while the second selector is arranged between the latter and said pump; and
- the specific controls of said first and second selectors allow said hydraulic connection ports to be connected not only to said control valve or to said pump, but also to both said control valve and said pump.

2. The system as claimed in claim 1, wherein said first selector: can adopt either a passing state or a non-passing state; spontaneously adopts its non-passing state; and is forced into its passing state by the action of the pressure of the hydraulic fluid of said hydraulic circuit, through a controlled electric valve.

3. The system as claimed in claim 1, wherein said second selector: can adopt either a passing state or a non-passing state; spontaneously adopts its non-passing state; and is forced into its passing state by the action of a control device.

4. The system as claimed in claim 1, wherein said second selector: can adopt any one of three states, namely a passing state, a non-passing state or alternatively a passive state for which said second selector establishes external communication with restriction between said hydraulic connection ports; spontaneously adopts said passive state; is forced into its passing state by the action of a control device; and is forced into its non-passing state by the action of the pressure of the hydraulic fluid of said hydraulic circuit, through said controlled electric valve.

* * * * *